(12) United States Patent
Komsi

(10) Patent No.: US 7,293,060 B2
(45) Date of Patent: Nov. 6, 2007

(54) ELECTRONIC DISC JOCKEY SERVICE

(75) Inventor: Asko Komsi, Cambridge, MA (US)

(73) Assignee: Nokia Siemens Networks Oy, Espoo, FL (US)

( * ) Notice: Subject to any disclaimer, the term of this patent is extended or adjusted under 35 U.S.C. 154(b) by 763 days.

(21) Appl. No.: 10/180,204

(22) Filed: Jun. 27, 2002

(65) Prior Publication Data

US 2003/0220970 A1  Nov. 27, 2003

Related U.S. Application Data

(60) Provisional application No. 60/382,083, filed on May 22, 2002.

(51) Int. Cl.
*G06F 15/16* (2006.01)
*G06F 17/00* (2006.01)

(52) U.S. Cl. .................. 709/203; 709/204; 705/14; 700/94; 84/600; 463/1

(58) Field of Classification Search ............... 709/203, 709/204; 700/94; 705/14; 84/600; 463/1
See application file for complete search history.

(56) References Cited

U.S. PATENT DOCUMENTS

| | | | |
|---|---|---|---|
| 5,917,480 A | 6/1999 | Tafoya et al. | |
| 5,920,311 A | 7/1999 | Anthias | |
| 5,966,440 A * | 10/1999 | Hair | 705/26 |
| 5,977,983 A | 11/1999 | Einkauf et al. | |
| 6,052,676 A | 4/2000 | Hekmatpour | |
| 6,098,126 A | 8/2000 | Batson et al. | |
| 6,199,076 B1 | 3/2001 | Logan et al. | |
| 6,223,210 B1 | 4/2001 | Hickey | |
| 6,248,946 B1 * | 6/2001 | Dwek | 84/609 |
| 6,434,621 B1 * | 8/2002 | Pezzillo et al. | 709/231 |
| 6,489,549 B2 * | 12/2002 | Schmitz et al. | 84/609 |
| 6,496,802 B1 * | 12/2002 | van Zoest et al. | 705/14 |
| 6,529,873 B1 * | 3/2003 | Owen | 704/260 |
| 6,578,008 B1 * | 6/2003 | Chacker | 705/10 |
| 6,581,103 B1 | 6/2003 | Dengler | |
| 6,675,168 B2 * | 1/2004 | Shapiro et al. | 707/10 |
| 6,725,275 B2 * | 4/2004 | Eyal | 709/231 |
| 6,735,628 B2 * | 5/2004 | Eyal | 709/223 |
| 6,748,395 B1 * | 6/2004 | Picker et al. | 707/102 |

(Continued)

OTHER PUBLICATIONS

The hard reality behind 3G services, http://dailynews.yahoo.com/h/zd/20010070hard_reality_behind_3g services1.ht, 3 pages, dated Jul. 9, 2001.

(Continued)

*Primary Examiner*—David Wiley
*Assistant Examiner*—Alina Boutah
(74) *Attorney, Agent, or Firm*—Banner & Witcoff, Ltd.

(57) ABSTRACT

An electronic disc jockey service in which the services of a disc jockey are effectively transformed into an Internet-based (or other network-based) service that is accessible from anywhere the Internet is accessible. Disc jockey services may in theory be provided to anybody, anytime, anywhere, as long as they have sufficient access to the Internet or other network. This service also may be used to link together several parties going on at the same time in different geographic locations. Thus, several parties that are separated by great distances may be united into a single virtual party. The electronic disc jockey service may deliver various content to the parties such as music, video clips, interactive games, and the like.

10 Claims, 4 Drawing Sheets

U.S. PATENT DOCUMENTS

| | | | |
|---|---|---|---|
| 6,794,566 B2 * | 9/2004 | Pachet | 84/600 |
| 6,895,084 B1 * | 5/2005 | Saylor et al. | 379/88.22 |
| 6,933,432 B2 * | 8/2005 | Shteyn et al. | 84/609 |
| 6,933,433 B1 * | 8/2005 | Porteus et al. | 84/615 |
| 2001/0025259 A1 * | 9/2001 | Rouchon | 705/26 |
| 2001/0032028 A1 * | 10/2001 | Volpe et al. | 700/94 |
| 2001/0042002 A1 * | 11/2001 | Koopersmith | 705/10 |
| 2002/0020279 A1 * | 2/2002 | Funaki | 84/478 |
| 2002/0053078 A1 * | 5/2002 | Holtz et al. | 725/14 |
| 2002/0065034 A1 * | 5/2002 | Zhang | 455/2.01 |
| 2002/0095228 A1 * | 7/2002 | Corts et al. | 700/94 |
| 2002/0138593 A1 * | 9/2002 | Novak et al. | 709/219 |
| 2003/0023973 A1 * | 1/2003 | Monson et al. | 725/34 |
| 2003/0037035 A1 * | 2/2003 | Deguchi | 707/1 |
| 2003/0050058 A1 * | 3/2003 | Walsh et al. | 455/426 |
| 2003/0052913 A1 * | 3/2003 | Barile | 345/745 |
| 2003/0084142 A1 * | 5/2003 | Casati et al. | 709/224 |
| 2003/0128825 A1 * | 7/2003 | Loudermilk | 379/101.01 |
| 2003/0210626 A1 * | 11/2003 | Liu | 369/53.18 |
| 2004/0019497 A1 * | 1/2004 | Volk et al. | 705/1 |
| 2004/0068536 A1 * | 4/2004 | Demers et al. | 709/201 |
| 2006/0015904 A1 * | 1/2006 | Marcus | 725/46 |

OTHER PUBLICATIONS

G. Faria, "Mobile DVB-T Using Antenna Receivers", 7 pages, printed Jul. 11, 2001.

G. Faria, "MCP Report to 42° TM", 12 pages, printed Jul. 11, 2001.

M. Lipsanen, "Interactivity with GSM in a Portable Terminal", Nokia Home Communications, 14 pages, dated Oct. 25, 2000, Downloaded and printed from DVB.org website on Jul. 11, 2001.

Patent Abstracts of Japan including English Translation of Patent; Publication No. 2002-091450; date of Publication of Application Mar. 27, 2002.

http://archive.developer.com/midi@perl.org/msg00104.html; "Virtual DJ"; Dec. 12, 2001; The Guardian.

"Its' Anchors Away For Apollo," Apollo Interactive, Inc., 2003; www.apollointeractive.com/press/press.phb?article=44 &arcfhive=1&chg=.

http://abcnews.go.com/sections/scitech/DailyNews/cybershake020128.html; "Playing DJ on the Web", Sep. 29, 2003.

* cited by examiner

ELECTRONIC DISC JOCKEY SERVICE

RELATED APPLICATIONS

The present application claims priority to copending U.S. Provisional Patent Application Ser. No. 60/382,083, entitled "Electronic Disc Jockey Service," filed May 22, 2002.

FIELD OF THE INVENTION

The present invention is directed generally to new broadband services for networked users, and more particularly to a new way of using broadband technologies to provide disc jockey and entertainment-related services via the Internet.

BACKGROUND OF THE INVENTION

Traditionally, disc jockeys have been hired to host parties or other gatherings, such as at a bar, disco, wedding reception, and the like. The current way of setting up parties with disc jockeys has various problems and inefficiencies. For example, traditional disc jockeys must be present at the party in person, and the music that is available is limited by the number of compact discs (CDs), records/LPs, and other media the disc jockeys can carry with him or her. This also means that the availability of disc jockeys is limited generally to those disc jockeys that are within a reasonable traveling distance to the party location. Another problem is that the interaction between the party-goers and the disc jockey is typically limited where the number of people attending the party is large (e.g., hundreds of people) and/or the party location is spread over a large area such as a large auditorium. Yet another problem with conventional parties is that party-goers can often not communicate with each other very easily. This is especially true where the party is large and/or noisy.

There is a need for an improved entertainment service at parties and other gatherings, as well as a way for party-goers to more easily interact with one another.

SUMMARY OF THE INVENTION

Aspects of the present invention improve the basic concept of disc jockeys and makes disc jockey services widely available for anyone with Internet access, and especially for those with broadband Internet access. The services of a disc jockey are effectively transformed into an Internet-based service that is accessible from anywhere the Internet is accessible. The various aspects of the present invention may also be used with networks other than the Internet.

According to further aspects of the present invention, disc jockey services may in theory be provided to anybody, anytime, anywhere, as long as they have sufficient access to the Internet or other network. This service also can link together several parties going on at the same time in different geographic locations of the world, whether on the same continent or different continents, to create the impression of a cohesive party community regardless of the physical location(s) of the party or group of parties. As a consequence, the electronic disc jockey service can be greatly enhanced to provide more than what the current disc jockey services can provide. Accordingly, the best disc jockeys can be available for anybody around the world as long as they have Internet access to this service. The user can access a huge collection of old and new music in a variety of styles. The available music may be limited only by the deals made by the service provider. However, the present invention is not limited to music services. Content that can be delivered to the parties may be limited only by their availability and technical suitability to be broadcasted over the Internet to the parties.

Further aspects of the present invention allow rich communication to take place between a party-goer and a disc jockey. The entertainment provided may be tailored to suit the party-goers' preferences. Since a wide variety of different kinds of disc jockeys and a wide variety of different types of entertainment content may be provided, arrangers of a party may choose to customize the disc jockey service to suit their own needs.

According to still further aspects of the present invention, several parties that are separated by great distances may be united into a single virtual party by using various tools that may be provided for the parties to communicate with each other.

According to still further aspects of the present invention, various business methods, including pricing, advertising, marketing, customer targeting, funding, manning, and/or other strategies, may be implemented in connection with electronic disc jockey services.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation.

DETAILED DESCRIPTION OF ILLUSTRATIVE EMBODIMENTS

Figure 1:
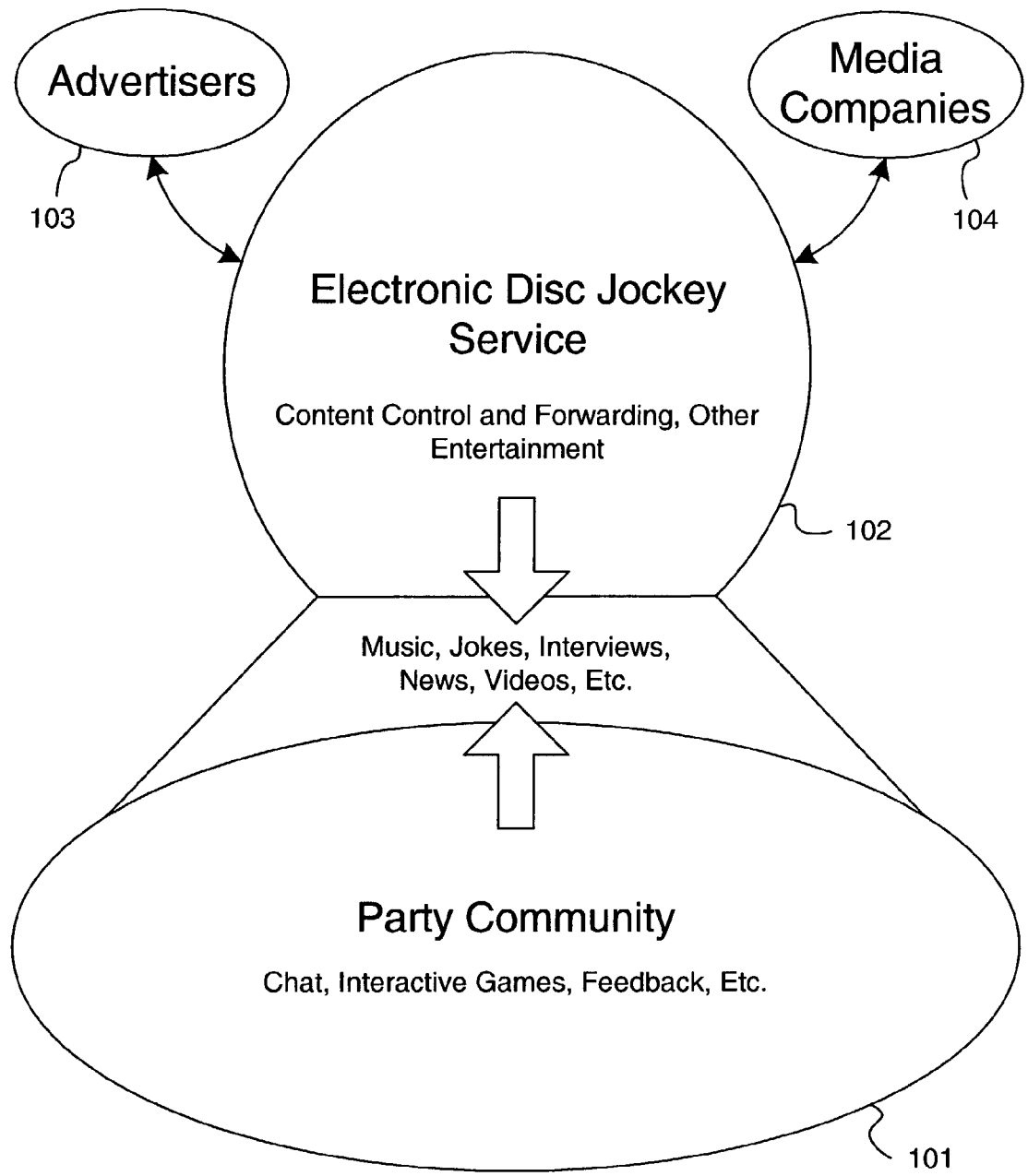
FIG. 1 is an illustrative functional block diagram in accordance with at least one aspect of the present invention.

Referring to FIG. 1, one or more party communities 101 may be coupled to an electronic disc jockey service 102 via a network such as the Internet. The party community 101 has a plurality of party-goers (also referred to herein as users) that attend the party/parties. The party community 101 may be a single party at a single physical location, a plurality of different parties at different and geographically-separate locations (e.g., a fixed location at each of two different cities on the same continent or on different continents), and/or a group of users who each may not be in the same physical place as one another. For instance, the party community 101 may be a single party in a particular house. Or, the party community 101 may be, e.g., three parties at three different physical locations. Also, some or all of the party locations may be fixed or mobile.

The electronic disc jockey service 102 may have access to a plurality of content items, which may include broadband content such as video and/or music, as well as narrowband content such as text and photographs. Content may further include interactive games, advertising, stories, jokes, cartoons, animations, and/or other similar content in any media format as discussed further herein. The electronic disc jockey service 102 may have agreements with advertisers 103, media companies 104 (such as record companies), and/or other entities, for providing access to advertising content, entertainment content, and/or other content. Record companies and other content providers are constantly looking for new mediums on which to sell their content; the present invention is one such way. Such agreements may allow the electronic disc jockey service 102 to not be required to store all of the content itself, but instead to have access to third-party preexisting storage of such content. The role of the record companies and other content sources may be to provide the content to the electronic disc jockey service for a fee. Some variation in content pricing may be expected, such as where the content is popular, current, or difficult to provide. The electronic disc jockey service 102 is much like a traditional in-person disc jockey but is implemented as a networked service (e.g., via the Internet) with access to a huge collection of content.

Advertisers may provide the electronic disc jockey service advertising content in the form of images, video clips, audio files, and the like, which can be delivered by the electronic disc jockey service as part of the service. The advertisers may pay a fee for this service, and the fee may be based on, e.g., the type and/or quantity of advertising content actually played, and/or the advertising length.

In certain embodiments, the electronic disc jockey 102 may have the role of party host and may arrange the delivery of various content based on preferences given at the time of purchase and/or at the time the service is running. The delivery of content may further be arranged based on the needs of the advertisers, other parties going on at the same time, world news events, and/or other factors.

Figure 2:
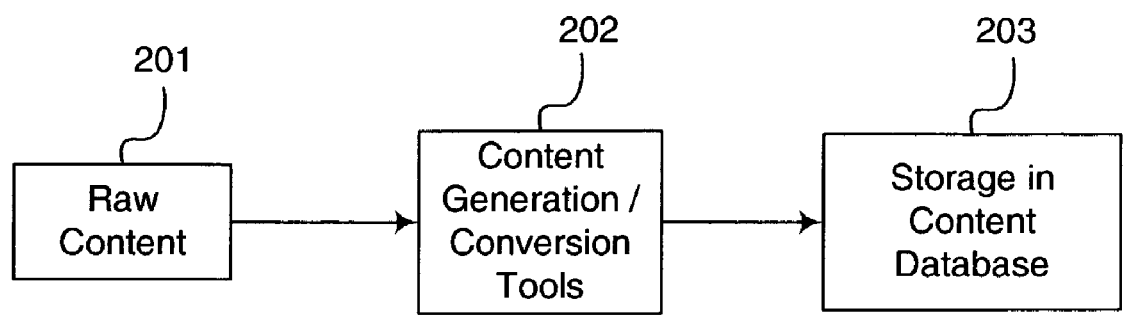
FIG. 2 is an illustrative functional block diagram showing content generation in accordance with at least one aspect of the present invention.

The content provided by the electronic disc jockey 102 may be anything that can be delivered through the Internet (or other network) to the party community 101 as long as the party community 101 has the support for it (i.e., can play the content for the party-goer users). Referring to FIG. 2, an illustrative embodiment of how content is generated is shown. Raw content 201 may be generated or otherwise provided in different formats, such as video tapes, video disks, compact discs (CDs), audio tapes, books, advertisements, etc. The raw content 201 may be analog or digital. In one illustrative embodiment, the raw content 201 may be either digital to start with (CDs, video disks, etc.) or the raw content 201 may be converted to a digital format and/or edited using various known content generation tools 202. For example, books, jokes etc. may be finally presented as digital audio or simply as digital documents. In sum, the raw content 201 may be converted to any suitable content format as desired. Of course, the raw content 201 may already in the desired format (e.g., MP3), and in that case no conversion, or else minimal conversion/editing, need be performed. Once converted as desired, the converted content may then be stored in a storage device, such as in a database 203, for use by the electronic disc jockey service 102. Content may also be produced and/or converted live during a DJ party session, such as from a live broadcast television station.

Figure 3:
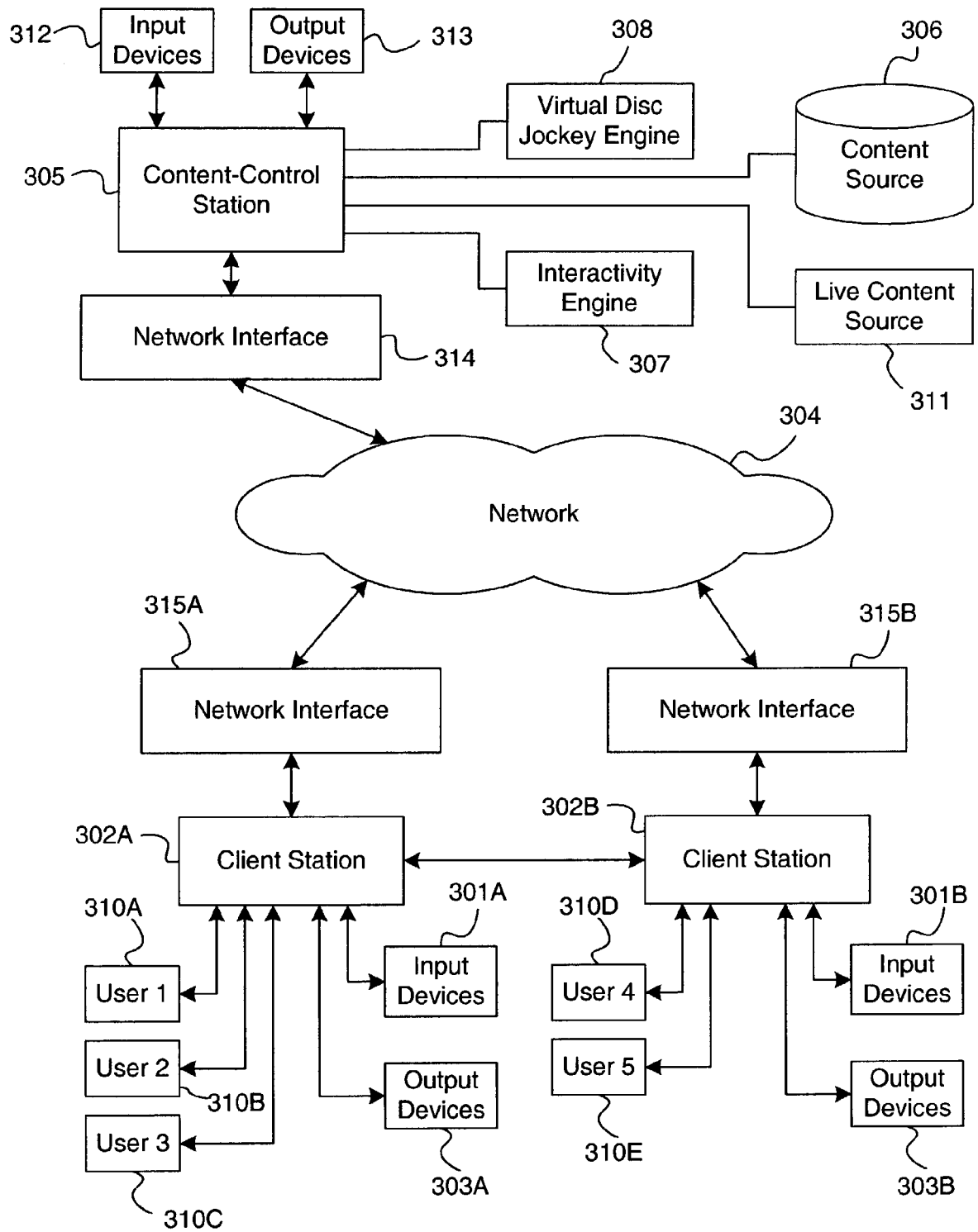
FIG. 3 is a functional block diagram of an illustrative architecture that may be used in accordance with at least one aspect of the present invention.

Referring to FIG. 3, an illustrative overall architecture of an electronic disc jockey service is shown. FIG. 3 further shows an illustrative overall architecture of a client served by the electronic disc jockey service. The electronic disc jockey service may include one or more content-control stations 305. The content-control station 305 may contain some or all of the basic functionality to control and provide content to the party-goer users. The content-control station 305 may include any type of personal computer, laptop computer, server, and/or other type of computer, and may further include one or more storage devices and/or input/output devices.

The content-control station 305 may be coupled with one or more content storage devices 306. The content storage device 306 may include one or more hard drives, disk drives, optical drives, tape drives, memories, databases, and/or any other type of storage device. The content storage device 306 may contain predetermined content and/or may be updated in real time such as by receiving content from the Internet, a live source, a radio broadcast, a television broadcast, and/or the like. The content-control station 305 may control which of the content available in the content storage device 306 is provided to the client.

The client may include one or more client stations 302A, 302B that may be coupled to the content-control station 305 via a network 304. The client stations 302A, 302B may be proximate to one another (e.g., in the same room or building) or may be physically distant from one another (e.g., in different cities or countries), and optionally can communicate with one another directly or via the network 304. The client may further include one or more input devices 301A, 301B and/or one or more output devices 303A, 303B coupled to the client station(s) 302A, 302B, which may help make the electronic disc jockey experience more interactive and fun. The input devices 301 may include any input device such as one or more still cameras, video cameras, keyboards, touch-sensitive pads, mice, trackballs, joysticks, touch-screen displays, microphones, voice-recognizers, motion sensors, video cassette recorders, digital video disk players, live television receivers, wired data ports, and/or wireless data ports. The output devices 303 may include any output device such as one or more audio systems, video systems, multimedia systems, speakers, video or television displays, video projectors, lights, buzzers, controlled robots, wired data ports, and/or wireless data ports. The input devices 301 may also have output functionality, and likewise the output devices 303 may also have input functionality. For example, a touch-screen display has both input and output functionality.

The client may further be coupled to a plurality of users 310A-E that may all be part of the same party community 101. The input devices 301 and/or the output devices 303 may be commonly used by some or all of the users, or they may be specific to particular users. For instance, the output devices 303 may include a video monitor that a plurality of the users 310 may view simultaneously (assuming those users are of course in the vicinity of the video monitor). Or a single shared microphone may be available to a plurality of the users. As an example of a more user-specific input device, a plurality of the users 310 may each have their own camera, each of the cameras being coupled to the client station 302A and/or 302B.

The client station(s) 302A, 302B may include various hardware and/or software for receiving and processing content from the content-control station 305 and/or for providing the content to the output devices 303. The software may further receive and process upstream feedback from one or more of the users 310 directed toward the client station 302 and/or the electronic disc jockey service 102. Such feedback may be in form of providing data such as photographs, live video, stored video clips, voice or text messages, and the like, which may be intended for sharing with other users 310 in the party community 101. User feedback may further be in the form of requests directed to the electronic disc jockey service 102 to provide the party community 101 (or a subset thereof) with particular content.

The client station 302 may further include various hardware and/or software for communicating with the content-control station 305 and/or for providing various services to the users 310. For example, the client station 302 may include various interaction applications, entertainment content players (for audio, video, animations etc.), basic community service applications (chatting, video playing, photo exchange, interactive games, competitions, etc.), and/or download mechanisms for additional features like new games and other new functionality. These local inter-user services may require that there is hardware and/or software support for these in the client station 302 and/or the content-control station 305. Some or all of these advanced features may be delivered to the client station 302 and/or the users 310 as downloadable plug-ins (Java etc.) from the content-control station 305.

The users 310 may each use one or more of the input devices 301 to provide the feedback, to send content items (such as images, songs, audio clips, video clips, and the like to be shared with other party-goers), and/or to receive the content items provided by the content-control station 305. Some or all of the input and/or output devices 301, 303 may be embodied as part of personal electronic devices associated with some or all of the users (the personal devices may be portable and carried by the users 310) such as mobile phones (e.g., cellular phones), personal computers, laptop computers, palm-top computers, personal digital assistants (PDAs), wrist computers, pagers, virtual-reality apparatus, and/or combinations or subcombinations thereof. The use of such personal electronic devices may provide party-goers with anonymity such that interaction (e.g., messages, requests for content, and the like) may be provided to the party-goers and/or the electronic disc jockey without revealing the identity of the party-goer user that was the source of such interaction. Such personal electronic devices may further provide privacy to those users who wish to interact with one another without allowing others at the party be privy to such interaction. The input and/or output devices 301, 303 may further include specially-designed for the purpose of interacting with the party, such as a wireless "party gadget." The input devices 301 and/or the output devices 303 may be coupled by wire and/or wirelessly with the client station 302. The input devices 301 and/or the output devices 303 may further communicate with the client station 302, and/or with each other directly or via the client station 302. The input devices 301 and/or the output devices 303 may further communicate with the content-control station 305 via the client station 302 and the network 304. Further, the input and/or output devices 301, 303 may each have a unique identifier (such as a phone number or serial number) that is unique to at least the members of the party. The unique identifiers may be predetermined as part of each device or may be assigned by the electronic disc jockey service. Where the input and/or output devices 301, 303 have a phone number associated therewith for normal communications, a different number may additionally be assigned for use with the party to allow special interaction with other party-goers in the same or a related party.

The content-control station 305 may further be coupled to a virtual disc jockey engine 308, which may include a computer, software, and/or a storage device, for providing a virtual disc jockey. The client station 302 may additionally or alternatively include its own virtual disc jockey engine that may communicate with its counterpart 308. A virtual disc jockey is a representation of a disk jockey that is provided to the users 310. The representation may be visual and/or audible in nature, and may be an animated graphical character, such as a three-dimensional character, a cartoon, a texture-mapped animated character, based on pre-recorded video clips, based on interactive artificial models of real disc jockeys, and/or the like. The virtual disc jockey may be programmed to respond to requests made by the party community 101. Such requests may be made, and responded to, in real time or nearly real time.

Figure 5:
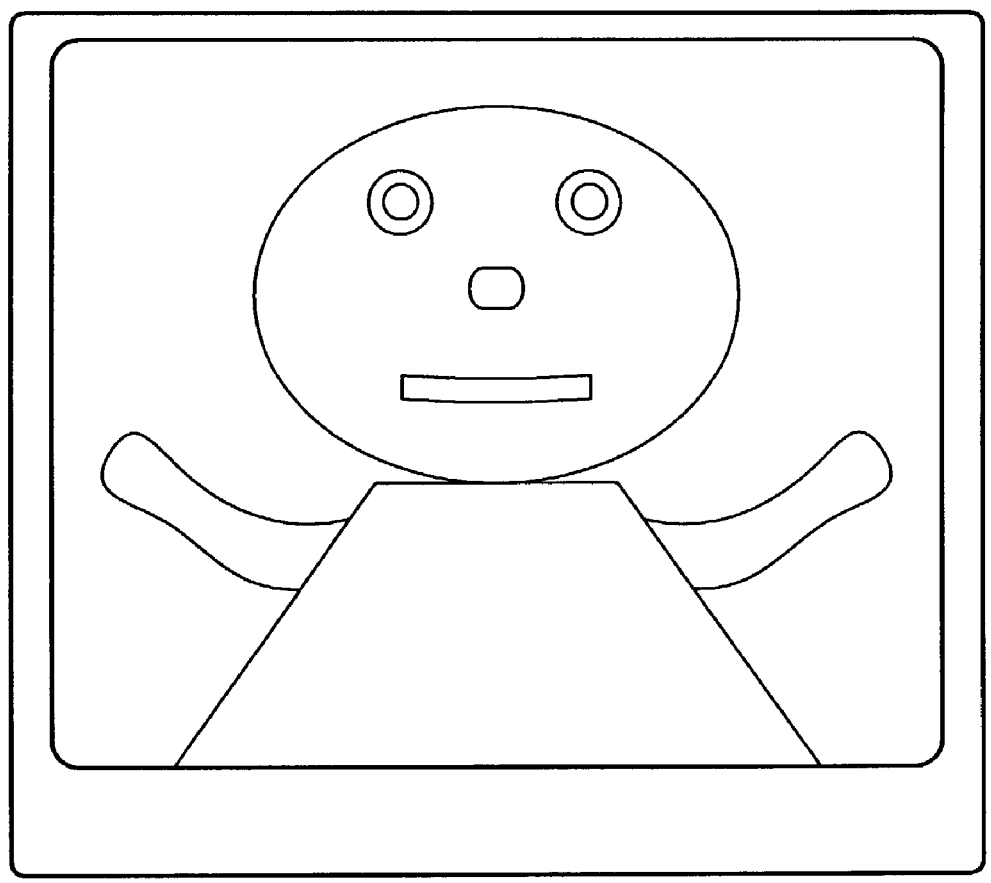
FIG. 5 is a screen shot of an illustrative virtual disc jockey in accordance with at least one aspect of the present invention.

The virtual disc jockey engine 308, which generates the virtual disc jockey, may be physically different from the content-control station 305 and/or may be part of the content-control station 305. The virtual disc jockey engine 308 may be a physical machine or may be purely software-based and resident on the content-control station 305. Where the virtual disc jockey includes visual aspects, the virtual disc jockey may be displayed on a visual-type output device 303 such as a video monitor. Where the virtual disc jockey includes audio aspects, the virtual disc jockey engine 308 may provide audio that is associated with movements of the visible animated virtual disc jockey (such as associated with movements of portions of the body or face, e.g., the mouth). When such movements are associated with the audio, and where the audio is a real or simulated human voice, this may give the appearance that the virtual disc jockey is talking. The virtual disc jockey may further be interactive and responsive to feedback from the users 310. A screen shot of an illustrative virtual disc jockey is shown in FIG. 5. This particular virtual disc jockey has a face (which may be human-like, animal-like, robot-like, or otherwise), and there may be audio associated with movements of the face.

The content-control station 305 may further be coupled to an interactivity engine 307, which may include a computer, software, and/or a storage device, for providing or assisting with interactive services in association with certain content, such as interactive games, video games, competitions, quizzes, jokes, etc. The interactivity engine 307 may be physically different from the content-control station 305 and/or may be part of the content-control station 305. The interactivity engine 307 may be a physical machine or may be purely software-based and resident on the content-control station 305.

As previously discussed, the content-control station 305 may further be coupled to the content storage device 306. The content storage device 306 stores content that is available for use by the content-control station 305. To access particular content, the content-control station 305 may send a request to the content storage device 306 for the particular content, or may search for content in the content storage device 306 in accordance with key terms or genres. For example, the content-control station 305 may search the content storage device 306 for all music performed by Queen, or for all classical music performed on a guitar, or even for a particular song title. Of course, music is only one of many possible types of content. To aid in searching, the content storage device 306 may store the content in an organized manner, such as in a database.

The content-control station 305 may further be coupled with one or more feeds from one or more live content sources 311. A live content source refers to a source of content that is received from a third party on a live feed. Content items from the feed are referred to herein as live content items. The original performance of the content item need not be live, but the broadcast or forwarding of the content is live. For example, a particular television station may be broadcasting the news, and this news broadcast may be received in real time by a television receiver and provided to the content-control station 305 as a live content source 311.

The content-control station 305 may further be coupled with one or more input devices 312 and/or output devices 313, which may be any input or output device as previously described regarding input/output devices 301, 303. For example, the input devices 312 may include a video camera. This may allow, for example, a human controller operating the content-control station 305 (or another person acting as the party host, for example) to be seen by the users 310. Providing a live or pseudo-live video image of the person may be an alternative to providing a virtual disc jockey as discussed above, or this may be done in addition to providing a virtual disc jockey. Other examples of an input device 312 may be a keyboard, mouse, touchpad, touch-sensitive screen, or the like. The output devices 313 may include, for example, a video display for viewing still images, video, text and/or graphical messages, requests, and/or other information and/or content items, sent as feedback from individual users 310. The video display may further be used for viewing live video or images sent from a common camera (as an input device 301) located near the users 310. In addition or alternatively, the output devices 313 may include an audio system and/or speaker for providing sound that may be sent from the users and/or from one or more microphones (as an input device 301) in the vicinity of the users 310.

The content control station 305 and some or all of the client stations 302 may be coupled to the network 304 via one or more network interfaces 314, 315A, 315B. The network interfaces provide an interface between the network and the respective equipment connected thereto, and may provide for any data conversion, formatting, framing and de-framing, packetizing and de-packetizing, encryption and decryption, error-correction, addressing, and/or protocols necessary to ensure smooth transition between the equipment external to the network 304 and the network itself. The network interfaces may include, e.g., gateways, firewalls, servers, receivers, transmitters, and the like as appropriate. The network interfaces may be separate physical machines or may be incorporated into the control station 305 and/or the client station 302. The network 304 may be any network such as the Internet, a local area network, a wide area network, an optical network, a telephone network, a landline network, a satellite network, a wired network, a wireless network, and/or any other network or combination thereof such as a hybrid network. Upstream and downstream communications between the content-control station 305 and the client may be along different networks and/or different network paths, portions, and/or connections, and may have different bandwidth requirements.

Some or all of the elements of FIG. 3 may be assigned unique locators, such as an address. These locators may be considered different network destinations. For example, the users 310A-E may each be considered a unique network destination, and the two client stations 302A, 302B may each be considered a unique network destination. The same may be said for the input devices 301A, 301B and/or output devices 303A, 303B. In addition, individual input and/or output devices in 301, 303 may each be associated with unique network destinations. Some or all of the elements of FIG. 3 may also be grouped together to have a same network destination. For example, where there is no need to distinguish between the two client stations 302A, 302B, they may be considered to be a same network destination. Thus, requests may emanate from a one or more first network destinations (e.g., one of the input devices 301A that is portable and that is carried by user 310C) while content may be provided to one or more different second network destinations (e.g., one or more of the output devices 303A such as an audio system located at the site of the party community). As an example, user 310A may request a particular song using his or her cellular phone as an input device 301A, and the requested song may play on an audio system as an output device 303A and/or 303B. The particular destination to which an item of content is sent may also depend upon the type of content (e.g., whether it is audio, video, text, graphics, music, speech, etc.). This may be desirable where certain output devices are compatible with only certain types of content.

Figure 4:
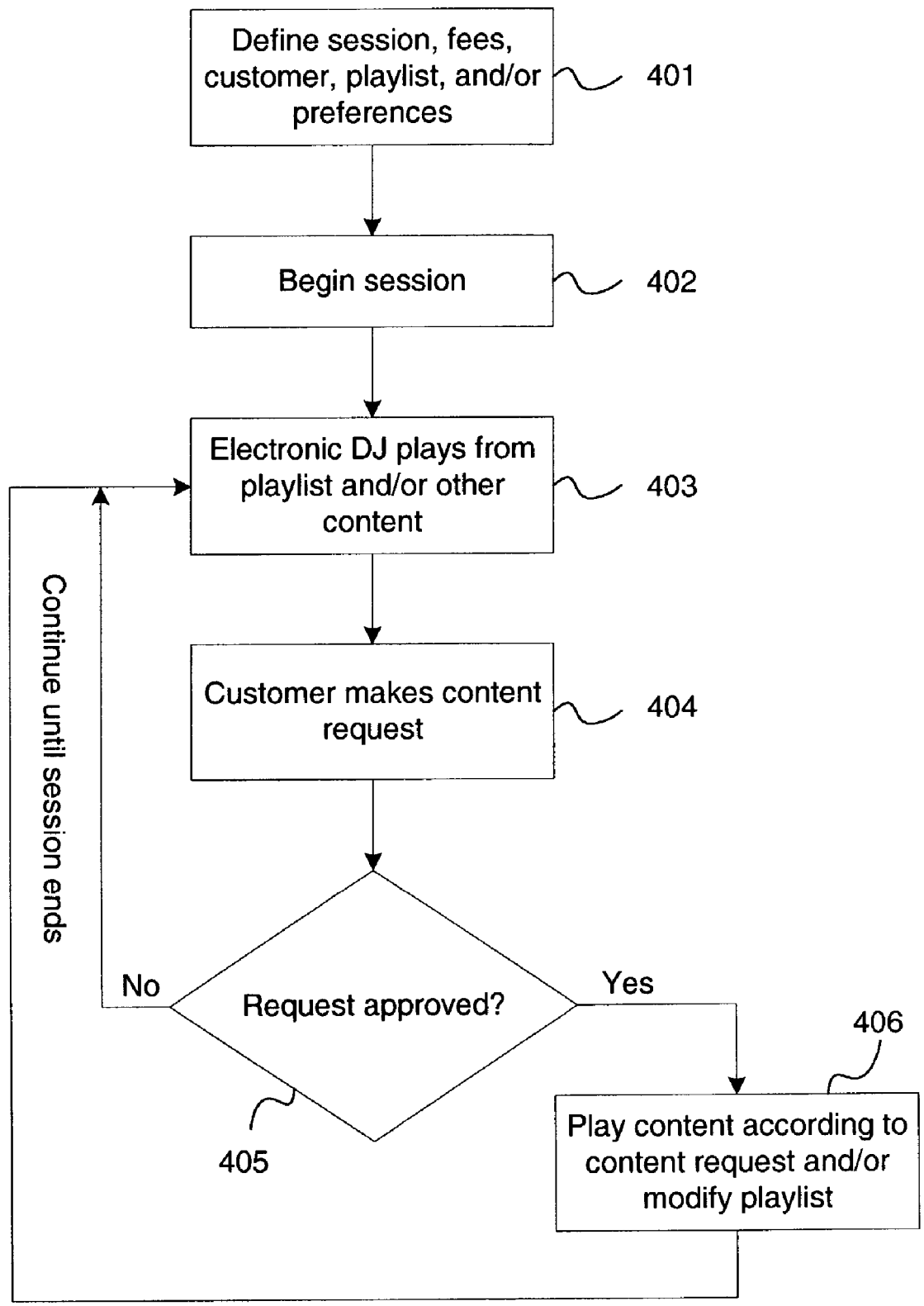
FIG. 4 is a flowchart showing illustrative steps that may be taken in accordance with at least one aspect of the present invention.

An illustrative operation of an electronic disc jockey service is now described. Referring to FIG. 4, a customer may contact the electronic disc jockey service to initiate or schedule the service. The term "customer" is broadly used herein, and includes any of the users 310 involved, the party community 101 in general, and/or any third party representing or working for them. The customer may contact the electronic disc jockey service by any of a variety of methods, such as by telephone, the Internet, in person, email, or the like. During this transaction, the customer and the electronic disc jockey service may agree to and/or otherwise define such elements as (but not limited to) the timeframe of a desired party session, the fees to be paid, the location(s) of the party community, the number of users expected to be a part of the party community, and/or the identities of the users that are expected to be a part of the party community (step 401). For example, the customer may desire that the session start at 8:00 pm on this coming Friday night and last until 1:00 am Saturday morning, and that up to 200 users may be a part of the party community at any one time regardless of their identities. Or, the customer may desire that only particular identified users be allowed access to the party. In the latter case, the customer may provide identities of those users (e.g., their internet protocol addresses or other identifying factors) to the electronic disc jockey service. These agreed-to elements may be communicated between the customer and the electronic disc jockey service via the network 304 (or via a different network such as a separate telephone network) and/or stored by the electronic disc jockey service in, e.g., the content-control station 305.

The customer may also desire certain preferences in connection with the party session (step 401). Such preferences may include, but are not limited to, such factors as the types and/or genres of content desired, a playlist, content formats, the bandwidth available at the site(s) of the party community, whether advertising content should be included, the format(s) of any requests to be made by the users, a style (if any) of virtual disc jockey, whether the party community is open to any user or closed to a particular set of users, a passcode for authorizing the party, an interactivity level (e.g., whether the users can interact with the electronic disc jockey and to what level), the types (if any) of jokes and/or games to be provided, what type of local services (e.g., chatting, photo exchange, etc.) are to be available to the users, and/or the audio and/or video quality of the provided content. For example, the customer may desire to only have rock 'n roll music, rock 'n roll music videos, and current news videos played at the party, to include advertising content (to reduce the fees), to have a hard-rocker-style virtual disc jockey, to allow only certain identified users to be included in the party community, and to allow the users to interact with the electronic disc jockey by email, real-time electronic chatting, and microphone. Where a passcode is defined and required, users may be allowed access to the content only upon providing the correct predefined passcode, when a user first logs on the to the party, at a certain predefined time, and/or in response to a request from the content control station 305. These preferences may be defined by the user at the time of the booking and/or in real time during the session. These preferences may also be communicated between the customer and the electronic disc jockey service via the network 304 (or via a different network such as a separate telephone network) and/or stored by the electronic disc jockey service in, e.g., the content-control station 305. In addition, the various elements and preferences agreed to may be temporarily or permanently stored in one or more registries, associated with the customer, for the currently-scheduled party and for use in any future parties scheduled by that particular customer. Also, any of the elements and/or preferences, individually or in any combination or subcombination, may affect the fees for the session.

Each party, group of parties, and/or party community may further be assigned a unique identification number and/or other unique identifier that may be used to distinguish the party or party community from other parties or party communities. This "party ID" may be referenced when a party-goer wishes to communicate or otherwise interact with another party-goer, and the party ID may be sent with the communication to the client station 302 and/or the content-control station 305. In this way, the client station 302 and/or content-control station 305 may regulate interaction between party-goers and may provide them with the impression of a single cohesive party amongst all of the party-goers of the same party or group of parties having the same party ID. When interacting, the party ID may be referenced manually by the interacting party-goer or automatically by the partygoer's personal electronic device. Alternatively, the party ID need not be included withinteractions amongst party-goers but instead may be used as an entry gateway or passcode to initially allow only those users who are authorized to interact with the party.

The fees for electronic disc jockey services may be based on a number of factors. For example, the fee may be determined in accordance with the total session time, such as per unit of scheduled or actual session time (e.g., per minute or per each four hours of session time), regardless of what goes on during the session such as how many content items are played during the session. It may be expected that for most parties, a party session will be scheduled for a total period of less than twenty-four hours, although the party session may be of any length. Other factors may include the number of content items played, the type of content items played, the number of users in the party community, the various preferences, the timeframe of the session, and the like. Payment may be made beforehand by any method such as by using credit cards, e.g., over the Internet. In one illustrative embodiment, the electronic disc jockey service is started only when the user provides a correct security passcode that is provided to the customer as part of the initial transaction in setting up the service.

Once the electronic disc jockey session has begun (step 402), the virtual disc jockey (if desired) or real disc jockey (e.g., viewed by the users via video camera) may begin providing content to the party community in accordance with the agreed-to terms and preferences (step 403). During the session the users can interact with the virtual or real disc jockey by sending requests. The disc jockey can also present quizzes, games, and the like, and some or all of the users in a particular party can play against each other, against the disc jockey, and/or against users at other parties, party communities, or other sites within the same party community. Audio/text chat lines and photo/video exchange services with other users within the same party community, within other party communities, or at other sites within the same party community, may also be made available. In doing so, party-goers may exchange content items such as audio clips, video clips, songs, photos, and the like, with one or more of the other party-goers. For example, a party-goer could easily send a message to all of the other party-goers within the same party, simply by identifying the party. The electronic disc jockey service may also communicate or otherwise make available to each user the identities of the other users at the party and/or the other users at other related parties and/or locations. This makes it easier for users to decide with whom they may wish to play games, electronically chat, and/or otherwise interact.

The electronic disc jockey may further provide content from the content source 306 in accordance with a playlist, which may be predetermined prior to the session or determined dynamically during the session. The playlist is an ordered or unordered list or group of specific content expected to be provided during the session. The playlist may specifically name certain content items (e.g., "It's a Kind of Magic" by Queen), or may more generally name content items (e.g., play any two Queen songs during the session). The electronic disc jockey is not necessarily limited to the playlist, however, and can play other content as well.

The electronic disc jockey may further provide content from the content source 306 in accordance with requests from the users 310. When one or more of the users 310 makes a request (step 404), the virtual or real disc jockey may respond to the request with a response directed to that particular user or to all, or a subset of, the users 310 in the party community. For example, the virtual disc jockey may respond to a request for a particular song by saying, "Hey, man, that's a great song! I'll play it as soon as I can, dude!" The virtual disc jockey may also perform an animation in response to the request. In response to a request, the electronic disc jockey service may also decide whether to approve of the request (step 405). For example, the customer that set up the session may have requested that no classical music be played, and so if a classical piece is requested, the electronic disc jockey service may determine that the request should not be approved. If so, the virtual disc jockey may let the user know that the request has not been approved or authorized. Other reasons a request may be denied include the session time having not yet begun or having expired, there being a low or no expectation that the request will be satisfied in time before the session expires, the user 310 not being a member of the party community, and/or other reasons. The decision whether to approve the request may be made manually or automatically. Where the decision is manually made by a person, the decision whether to approve may be responsive to a manual input from one or more of the input devices 312, such as from a predetermined keyboard input. Where the request is approved, the electronic disc jockey may decide to play the requested content immediately (i.e., as soon as possible, such as at the completion of the currently-playing content), or may modify the playlist in accordance with the request (e.g., by adding the requested content to the playlist) (step 406).

The electronic disc jockey service may further provide content provided by one or more of the party-goers to others of the party-goers. For example, a first party-goer may send a content item such as a video clip to the client station 302. The content item, or at least data identifying or otherwise associated with the content item, may be sent from by the client station 302 to the content-control station 305 via the network 304. The content-control station 305 may decide to allow the content item to be sent to other party-goers or may decide not to allow the content item to be shared with other party-goers. To do so, the content-control station 305 may send a message to the client station 302 requesting the client station 302 to forward the content item to one or more of the party-goers, and/or may send the content item itself to the client station 302 for further dissemination to those party-goers. In this way, the content-control station 302 may exercise control over which content items are shared. Alternatively, the content item may be shared with other party-goers regardless of the content-control station 305.

Advertising content may also be played during the session, but only if desired when the above-discussed preferences are chosen. The electronic disc jockey service may reduce the fees charged for the service in exchange for being allowed by the customer to provide the advertising content. The advertising content may be distributed throughout the session, such as at predetermined scheduled times, on a random basis, and/or each time after a predetermined number of content items have been played. The advertising content may be in any format, such as video clips, audio clips, text, graphics, and the like.

Various illustrative embodiments and aspects of the present invention have been described above, and it will be understood by those of ordinary skill in the relevant art that there are various combinations and subcombinations thereof that fall within the spirit and scope of the invention as set forth in the appended claims. Also, it is to be understood that the various aspects of the present invention are not limited to party environments but can be utilized in a variety of other environments such as at wedding receptions, restaurants, nightclubs, sporting events, businesses, home, places for public gathering, and the like.

I claim:

1. An apparatus for providing electronic disc jockey services to a party community over a network, comprising:
   a content source configured to store a plurality of content items;
   a virtual disc jockey engine configured to provide a virtual disc jockey, wherein the virtual disc jockey is an animated graphical character displayed to the party community and is configured to respond to requests over the network from the party community;
   an interactivity engine configured to provide a plurality of interactive content items;
   a content-control station coupled to the network, the content source, the virtual disc jockey engine, and the interactivity engine, and configured to forward at least some of the content items, at least some of the interactive content items, and the virtual disc jockey over the network.

2. The apparatus of claim 1, further including:
   a client station coupled to the network and configured to receive the content items, the interactive content items, and the virtual disc jockey forwarded by the content-control station; and
   a plurality of output devices coupled to the client station and configured to receive at least one of the content items, the interactive content items, and the virtual disc jockey.

3. The apparatus of claim 2, wherein the plurality of output devices include a plurality of mobile phones.

4. The apparatus of claim 2, wherein the plurality of output devices further include input functionality.

5. The apparatus of claim 4, wherein the plurality of output devices are configured to generate a plurality of requests for at least one of the content items, the client station further configured to forward the requests over the network to the content-control station.

6. The apparatus of claim 4, wherein at least one of the plurality of output devices is configured to send a first content item to the client station, the client station further configured to forward data associated with the first content item to the content-control station over the network.

7. The apparatus of claim 6, wherein the content-control station is further configured to cause the first content item to be sent to at least another of the plurality of output devices.

8. The apparatus of claim 1, further including a network interface coupled between the content-control station and the network.

9. The apparatus of claim 1, further including a feed from a live content source coupled to the content-control station, the content-control station configured to forward at least one live content item from the feed to the network.

10. The apparatus of claim 1, wherein the virtual disc jockey includes a visual animated representation of a face.

* * * * *